US010949799B2

(12) United States Patent
Chaubard

(10) Patent No.: US 10,949,799 B2
(45) Date of Patent: Mar. 16, 2021

(54) ON-SHELF IMAGE BASED OUT-OF-STOCK DETECTION

(71) Applicant: Focal Systems, Inc., Burlingame, CA (US)

(72) Inventor: Francois Chaubard, Burlingame, CA (US)

(73) Assignee: Focal Systems, Inc., Burlingame, CA (US)

( * ) Notice: Subject to any disclaimer, the term of this patent is extended or adjusted under 35 U.S.C. 154(b) by 105 days.

(21) Appl. No.: 16/024,519

(22) Filed: Jun. 29, 2018

(65) Prior Publication Data

US 2020/0005225 A1  Jan. 2, 2020

(51) Int. Cl.
| | |
|---|---|
| *G06Q 10/08* | (2012.01) |
| *G06K 9/46* | (2006.01) |
| *G06T 11/20* | (2006.01) |
| *H04N 5/225* | (2006.01) |
| *H04N 5/232* | (2006.01) |

(52) U.S. Cl.
CPC ............ *G06Q 10/087* (2013.01); *G06K 9/46* (2013.01); *G06T 11/203* (2013.01); *H04N 5/2253* (2013.01); *H04N 5/23238* (2013.01); *G06K 2209/01* (2013.01); *G06T 2210/12* (2013.01)

(58) Field of Classification Search
None
See application file for complete search history.

(56) References Cited

U.S. PATENT DOCUMENTS

| | | | | |
|---|---|---|---|---|
| 4,402,088 | A  * | 8/1983 | McWaters | G06K 7/10881 382/324 |
| 8,630,924 | B2 * | 1/2014 | Groenevelt | G06Q 10/087 211/90.01 |
| 9,659,272 | B2 * | 5/2017 | Birch | G06Q 10/087 |
| 2008/0077511 | A1 * | 3/2008 | Zimmerman | G06Q 10/00 705/28 |
| 2019/0149725 | A1 * | 5/2019 | Adato | H04N 1/32144 348/158 |

* cited by examiner

*Primary Examiner* — Paul Danneman
(74) *Attorney, Agent, or Firm* — Fenwick & West LLP

(57) ABSTRACT

An out-of-stock detection system notifies store management that a product is out of stock. The system captures images of a shelf and determines the position product labels thereon. For each product label, a bounding box is generated based on the position of each product label on the shelf. The system then identifies a product for each product label based on information within each product label and, for each product label, stores a product identified for each bounding box. Accordingly, the system performs an out-of-stock detection process that includes capturing additional image data of the shelf periodically that includes each bounding box, providing a portion of the additional image data for each bounding box to a model trained to determine whether the bounding box contains products, sending a notification for a product determined to be out of stock to a store client device based on output from the model.

20 Claims, 9 Drawing Sheets

ON-SHELF IMAGE BASED OUT-OF-STOCK DETECTION

BACKGROUND

Stores offer items for sale to shoppers who visit the stores. As shoppers purchase the items that are available for sale, store management must continually restock items as shoppers purchase them. However, different items may need to be restocked at different rates and the rates at which items need to be restocked may change over time, and thus it is advantageous for store management to have up-to-date information on what items need to be restocked. Typically, in order to receive the up-to-date information, an employee of the store regularly traverses the store to identify which items need to be restocked. This requires a significant amount of employee-hours during the operation of the store. While store management can reduce the regularity with which an employee traverses the store, this comes at the cost of items remaining out of stock for greater periods of time during which shoppers cannot purchase them. Store management must balance employee time with restocking items, which itself requires resources from store management. As such, conventional methods for identifying out of stock items require significant resources from stores, thus increasing the stores' expenses.

SUMMARY

An out-of-stock detection system notifies store management that a product is out of stock. In an onboarding setup stage, the out-of-stock detection system obtains one or more images of a product display area in a store captured by a camera mounted on the product display area. The image of the product display area is analyzed to detect product labels, such as price tags or product identifiers attached to the product display area identifying a location for a product described by the product label. Retail store convention may position a product on a shelf above and to the right of its corresponding product label (or vice versa, depending on the store). Thus, using the location of a product label on a shelf of the product display area, the out-of-stock detection system defines a bounding box for a portion of the shelf that should contain the product. The out-of-stock detection system defines a coordinate system (e.g., x, y coordinates of the product display area or alpha, beta angles of the camera) that identifies the position of the bounding box within or with respect to the product display area or camera and stores the position of each bounding box for out-of-stock detection.

In a deployment stage after the onboarding setup stage, images of the product display area are periodically captured by the camera. The portion of the shelf corresponding to each bounding box determined and stored in the onboarding stage is extracted from the images and provided to a trained classifier model that outputs a prediction of whether this portion of the shelf is less than full and, therefore, require restocking or the store associates attention. Accordingly, the classifier outputs an out-of-stock prediction for each product and the out-of-stock detection system generates a notification to a store associate for products whose corresponding portion of the shelf is at least less than full based on the classifier's prediction.

An out-of-stock detection system as described herein allows a store's management to have up-to-date information on which items are out of stock within the store, so items can be restocked more quickly. It also removes the need for a store employee to travel through the store to determine which items are out of stock, thereby reducing the number of employee-hours that the store spends on restocking items. Furthermore, the out-of-stock detection system can collect and analyze data on the rate at which items need to be restocked and can present the analyzed data to the store management for more information on how often items need to be restocked.

DETAILED DESCRIPTION

Shelf Camera for Out-of-Stock Detection Overview

Figure 1:
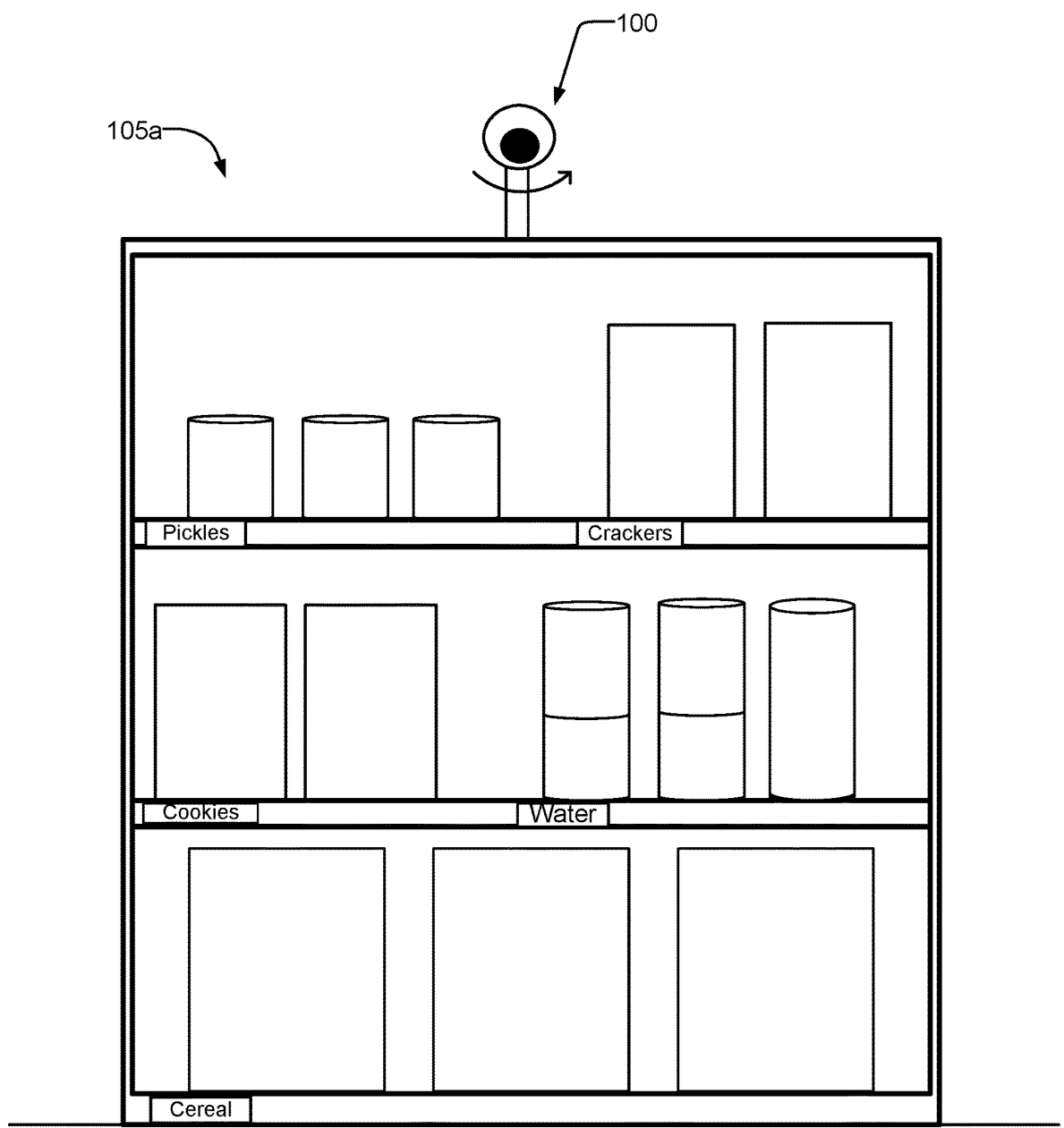
FIG. 1 illustrates an example camera mounted on a shelf in a store to capture images of products for out-of-stock detection, in accordance with various embodiments.

FIG. 1 illustrates an example camera 100 mounted on a shelf unit 105a in a store to capture images of products for out-of-stock detection. Camera 100 is one of many such cameras that may be deployed on shelf units within the store. For example, for an aisle of length L, the number of cameras 100 deployed to cover the length of the aisle is dependent on the field of view of the cameras 100 and the desired degree of overlap between them for applications, such as image stitching. As discussed below, the cameras 100 may additionally zoom-in, rotate, and/or move along a track or cable, in other embodiments, to minimize the number of cameras 100 deployed within a store and for various other applications. For fixed location cameras, however, each camera 100 is associated with a unique camera ID that is mapped to the camera's location within the store. As mentioned above, stores are organized in a predetermined layout or planogram that identifies where a particular product or category of products is located within the store. Thus, the camera's location indicated by its unique camera ID is associated with a predetermined set of products within the camera's field of view based on the planogram of the store. Each camera 100, in this instance, collects image data for a predetermined set of products displayed on the opposing shelf units relative to the shelf unit on which a particular camera is mounted for on-shelf inventory tracking and out of stock detection. Similarly, for movable cameras, a combination of camera ID and camera position along the track or cable can be used to identify which products should be within the camera's field of view.

In order for the out-of-stock detection system to register the camera 100 to its location within the store and associate it with the predetermined set of products within its field of view, an initial onboarding process is performed to train a product-detection model. In one embodiment, each camera 100 captures image data within the field of view of the camera 100 and sends the image data to the out-of-stock detection system where it is processed to identify the products within the cameras field of view.

Figure 2:
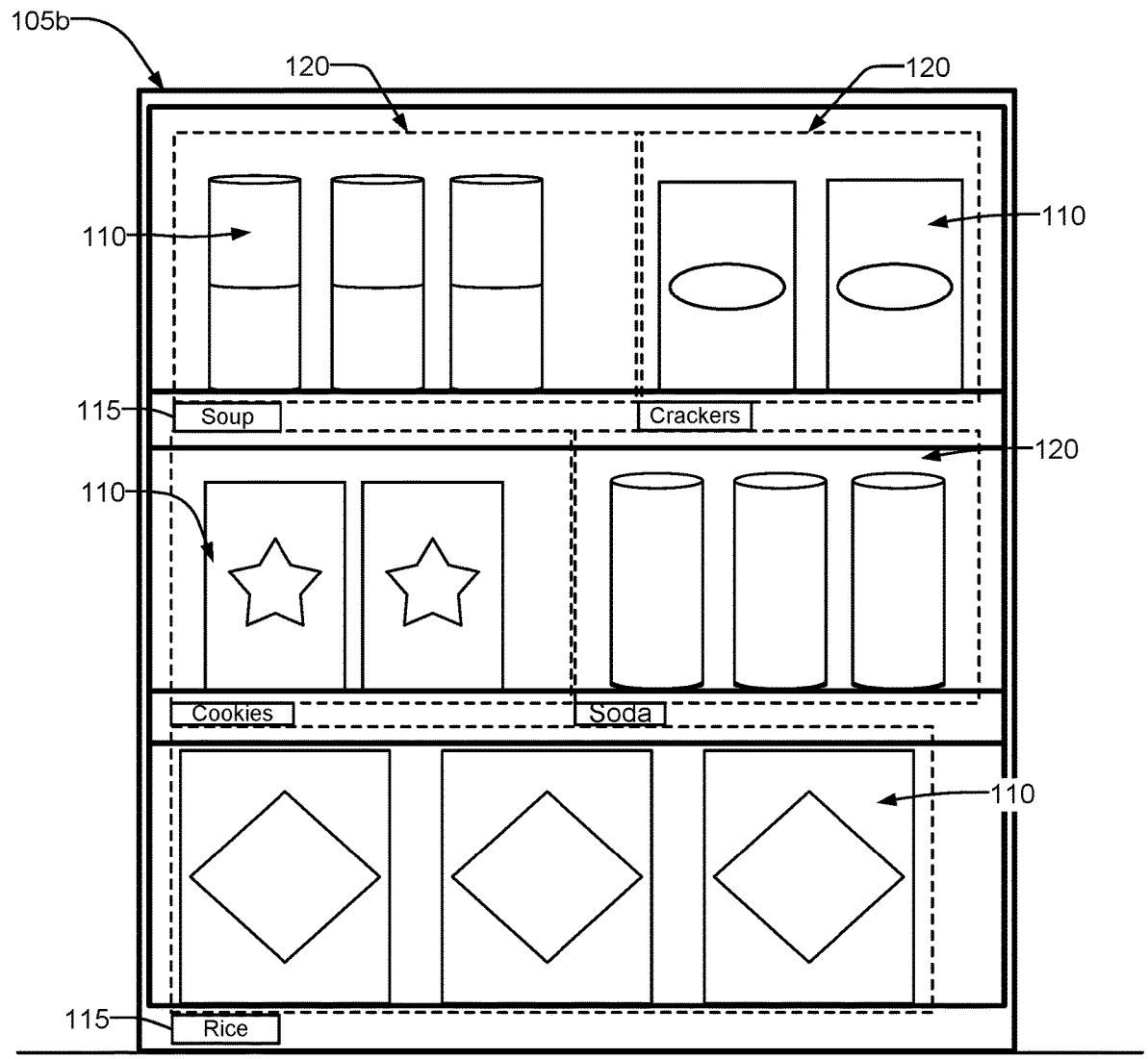
FIG. 2 illustrates an example image received from a camera for training a product-detection model, in accordance with various embodiments.

FIG. 2 illustrates an example image of shelf unit 105b standing opposite shelf unit 105a, upon which camera 100 in FIG. 1 is mounted. Shelf unit 105b includes multiple different products 110 and a product label 115 associated with each product 110 that may include a price tag. The out-of-stock detection system identifies product labels 115 within the image and a bounding box 120 for each product label 115 is generated based on the location of the product label 115. In one embodiment, the bounding boxes 120 are generated using a deep learning computer vision algorithm that identifies a product label 115 and generates a horizontal bound of the bounding box 120 at the product label 115 to the right (or left, depending on convention) of the product label 115 until another adjacent product label 115 is identified. This process can be repeated for the vertical bound of the bounding box 120 where the height of the bounding box 120 is determined as the vertical space between product labels 115. This process works for products on the bottom and middle shelves and other heuristics can be used to identify whether a particular bounding box 120 is on the top shelf. This may include identifying a product label 115 for a top shelf product based on the camera angle associated with the product label 115, which could be identified using a Deep Learning model or a labeler or identified manually, in some instances, by a human, such as a store associate.

Once the bounding boxes 120 are generated for each product label 115, the product 110 associated with each bounding box 120 is identified. As used herein, a product 110 associated with a bounding box 120 is an item of the same type and of the same brand. For example, a shelf unit may display multiple different brands and kinds of soap. Thus, as used herein, a product 110 refers to the same kind of soap being offered under the same brand name and each of the different brands and kinds of soap would have their own bounding box 120. Moreover, a product label 115 identifies a product display location for displaying the same type of product of the same brand, which is bounded by a bounding box 120.

Accordingly, there are multiple ways to identify the product 110 associated with each bounding box 120. In one embodiment, the out-of-stock detection system extracts product information from each product label 115, which includes information describing the product 110 associated with the product label 115. This information includes the product name and brand, price, barcode, and stock keeping unit (SKU) number, among potentially other types of information, and the out-of-stock detection system extracts this information to identify the product 110 associated with each product label 115 and, therefore, bounding box 120.

In one embodiment, an optical character recognition (OCR) algorithm is used to identify text of the product labels 115. Additionally, a barcode detection algorithm could be used to detect barcodes within the product label 115 and identify the products 110 based on the barcodes. While each camera 100 is capable of operating at a low image resolution to conserve energy, the cameras 100 may capture relatively high-resolution images during the onboarding process, and may optionally zoom in on each product label 115 individually in order to be able to clearly identify this information within each product label 115.

Similarly, instead of extracting information from the product labels 115, the out-of-stock detection system may extract information from the actual products 110 themselves or use this information to supplement that of the information extracted from the product labels 115. Moreover, the out-of-stock detection system may supplement the product information extraction process using the planogram of the store. For example, the out-of-stock detection system may obtain information for a particular shelf unit 105 from the planogram of the store that identifies what products should be on that particular shelf unit based on the camera ID for a particular camera 100 associated with the template image or images. The out-of-stock detection system may then use this information to narrow down or filter the extracted product information from each product label 115 to identify the product 110 associated with the product label 115. Alternatively, the out-of-stock detection system may identify a portion of the planogram corresponding to a particular shelf unit 105 and identify the products 110 on the shelf unit 105 by overlaying the planogram onto the image shelf unit 105 by, for example, spatially matching bounding boxes.

In another embodiment, the out-of-stock detection system presents the image with the generated bounding box 120 for each product label 115 for display to a store associate who manually identifies the product 110 associated with each bounding box 120 and inputs identifying information for the product 110, such as the SKU number, into an input field for each bounding box 120 provided in a user interface by the out-of-stock detection system.

The out-of-stock detection system associates the identified product 110 with its corresponding bounding box 110 for each product label 115. Accordingly, the out-of-stock detection system stores this information for later retrieval during a deployment stage of the process when the cameras 100 periodically scan their corresponding shelf unit.

Moreover, the camera can be equipped with a small motor that will pan the camera from the top left of each shelf unit 105, to the top right of the shelf unit 105, angle downward a bit, then repeat the process again, and again until the camera covers the entire field of view to the bottom right of the shelf unit 105. Effectively scanning the entire viewable area of the camera (or the entire shelf unit 105) while only requiring a 1-5 MP camera while zoomed-in. There will likely be overlapping pixels from adjacent images to allow for, in one embodiment, image stitching and the camera 100 may transmit each of the captured images along with their corresponding alpha and beta angles of the camera (from 0,0). Accordingly, once these images are received by the system, the system may optionally stitch the images into a single large image. Then, a human store associate can select at least a subset of products to track and receive notifications for restocking out-of-stock items. Thus, in one embodiment, the store associate selection may cause the system select particular alpha and beta angles for the camera corresponding to the position of selected bounding boxes for selected products and the system will only collect image data at these camera positions ongoing to track the store associates chosen products. The store associate can also set a capture frequency of the camera 100 to run product detection at a set period of time (e.g., every half hour, hour, etc.). The more frequent the capture frequency, the more energy is used which translates to greater operational and system costs. The lower the capture frequency, the lower the operational and potentially system costs, however, this comes with less "instantaneous" reporting. Thus, the out-of-stock detection system maintains template images or template image data that cover at least a subset of the shelf units and other display areas (e.g., shelf units, display tables, refrigerators, display areas of a produce section, etc.) of the store.

Accordingly, in the deployment stage, the out-of-stock detection system receives image data of one or more shelf units captured by a camera 100 periodically to perform product detection. In one embodiment, the image data received in the deployment stage is captured only for the alpha and beta angles of the camera for each bounding box 120 (or a subset thereof selected by the store associate). This may include a zoomed-in scan of each bounding box 120 for the identified angles. Alternatively, the image data captured in the deployment stage may include the entire field of view of the camera 100.

Figure 3:
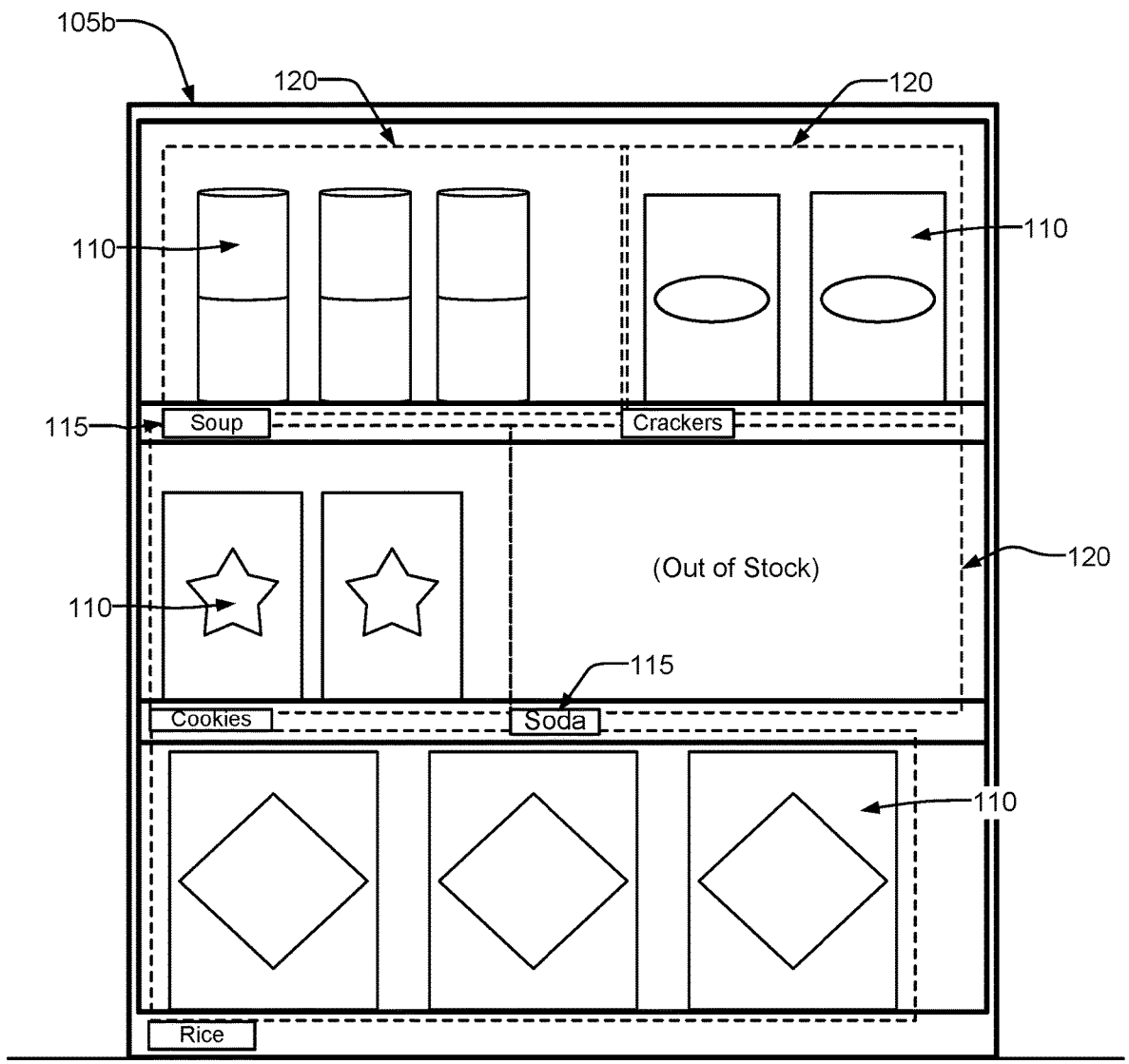
FIG. 3 illustrates an example image received from a camera for performing out-of-stock detection by the product-detection model, in accordance with various embodiments.

FIG. 3 illustrates an example image of shelf unit 105b received from camera 100 for performing out-of-stock detection by the product-detection model, in accordance with various embodiments. While FIG. 2 is described as an onboarding image of shelf unit 105b, FIG. 3 shows another image of shelf unit 105b captured during out-of-stock detection in the deployment stage, after the onboarding stage, and after some of the products 110 have been removed (i.e., purchased) and, therefore, out-of-stock. Thus, in this embodiment, the product-detection model receives image data for the bounding boxes 120 identified in the onboarding stage and performs image classification of the images to determine whether the product display area is full or not. In one embodiment, the product-detection model is a classifier configured to identify one or more voids within a bounding box 120. Thus, in this example, in response to determining that the bounding box 120 for "soda" is less than full (i.e., empty in, this example), the out-of-stock detection system generates an out-of-stock notification for "soda" to a store client device. Thus, out-of-stock can be defined in a number of ways according to the desire of a store. For example, a product can be considered out-of-stock when a single item is missing, when the shelf is empty, or somewhere in-between. The definition or classification of out-of-stock can be different for different products. For large items, out-of-stock may be a single item. For small items, such as canned goods, out-of-stock may be defined as a number of voids. Moreover, the turn or rate at which an item sells can also determine how a store classifies whether something is out-of-stock or not. For example, a store could define a fast moving or popular item as out-of-stock when a single item is removed from a shelf and vice versa.

Example Methods for Detecting Out-of-Stock Items

Figure 4:
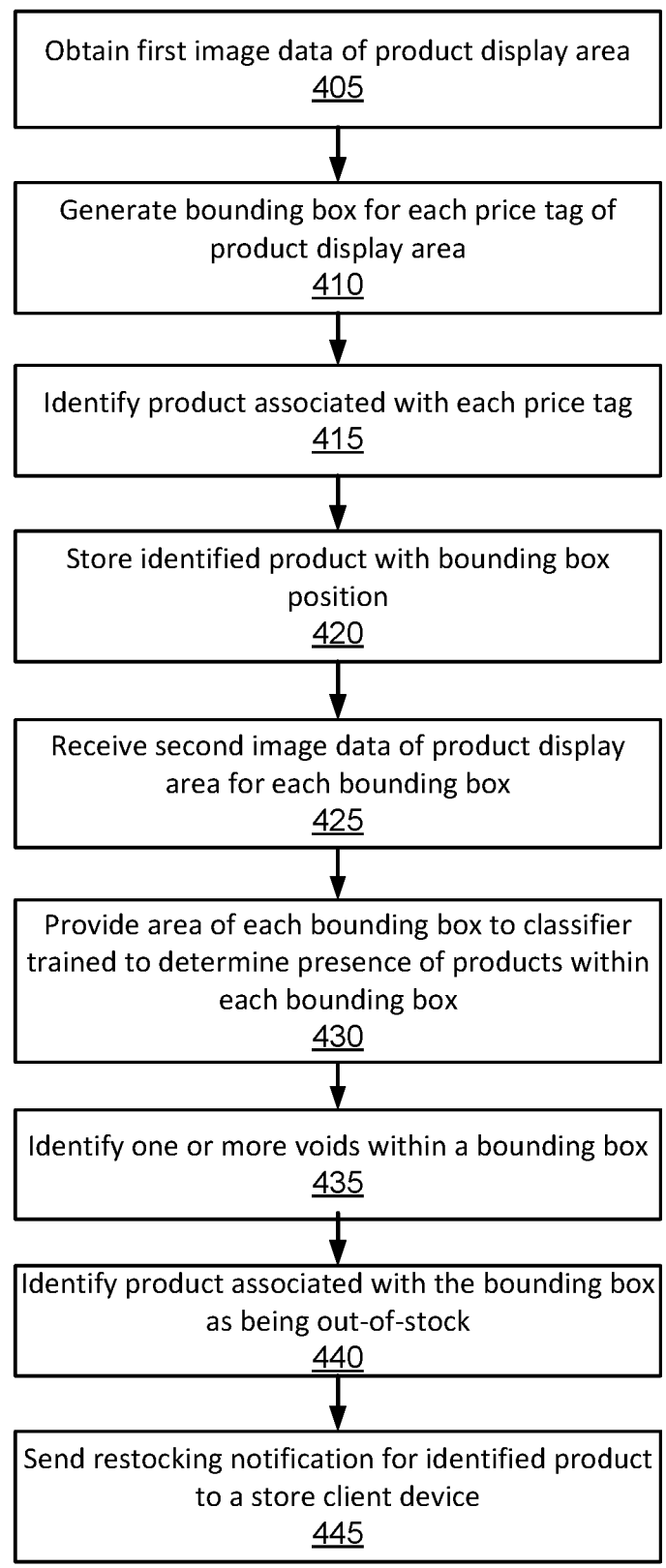
FIG. 4 is a flowchart for a method of detecting out-of-stock items based on images captured by one or more cameras mounted on shelves in a store, in accordance with various embodiments.

FIG. 4 is a flowchart for an example method for an out-of-stock detection system that includes both an onboarding stage and a deployment stage, in accordance with some embodiments. Alternate embodiments may include more, fewer, or different steps from those illustrated in FIG. 4, and the steps may be performed in a different order from that illustrated in FIG. 4. Additionally, each of these steps may be performed automatically by the out-of-stock detection system without human intervention.

In the onboarding stage, the out-of-stock detection system obtains 405 first image data of a product display area in a store captured by one or more cameras 100. The product display area includes a number of product labels 115 each identifying a product 110 and the system determines the position of each product label 115 within the product display area. Accordingly, based on the position of the product labels 115, the system generates 410 a bounding box 120. The system then identifies 415 the product 110 associated with each bounding box 120. As described above, this may include extracting product information from each product label using an OCR algorithm, for example, to identify text of the product labels. This may also include using a barcode detection algorithm to detect barcodes within the product label and identify the products from the barcodes. Similarly, instead of extracting information from the product labels, the system may extract information from the actual products. With the product 110 identified for each bounding box 120, the system stores 420 the identified product 110 with the corresponding bounding box 120.

In the deployment stage, the out-of-stock detection system receives 425 second image data of the product display area for each bounding box 120. As described above, the second image data may be solely limited to coordinates (i.e., alpha and beta angles of camera 100) for each bounding box 120 selected from tracking by a store associate or the second image data can include an image of the entire shelf unit or display area. In one embodiment, the system provides 430 the area of each bounding box 120 identified by the coordinates of the bounding box 120 to a classifier trained to determine presence of products 110 within each bounding box 120. In this example, the system classifier of the system identifies 435 one or more voids within a bounding box 120. Accordingly, in response to identifying 435 a void in the bounding box 120, the system identifies 440 the product 110 associated with the bounding box 120 as being out-of-stock and sends 445 a restocking notification for identified product 110 to a store client device.

In another embodiment, the out-of-stock detection system collects image data from one or more cameras in a store mounted to, for example, the store shelves. The out-of-stock detection system detects products, voids, and product labels in the image data and determines whether any products are out of stock based on the information detected in the image. For example, the out-of-stock detection system may detect a void on the shelf, and will then look at the product label underneath the void to see what should have been there, and determine that that product is out of stock. In another embodiment, the out-of-stock detection system does not identify the product in the deployment state, but rather determines whether a given bounding box is full or not (i.e., there are one or more voids in the bounding box or the bounding box is full) where the position (alpha and beta angles) of that bounding box are stored in association with a product that was identified in the onboarding stage. Thus, in the deployment stage, the system identifies a bounding box 120 as being less than full, sends an out-of-stock notification to the system for that particular bounding box 120, and the system matches the bounding box to a product, which it has stored in a look-up table, for example. Thus, upon identifying a product as out-of-stock, the out-of-stock detection system notifies the store management that the item is out of stock.

In another embodiment, one or more cameras of the out-of-stock detection system capture a template image of a fully stocked product display area for each product display area in a store. The system identifies product labels in the template image and generates a bounding box for each product label based on a location of each product label within the product display area. From each product label, the system identifies product information from each product label.

Accordingly, using the identified product information, the system identifies a product associated with each product label. In one embodiment, the system extracts product information from each product label, which includes information describing the product associated with the product label, as described above. With the product identified for each bounding box, the system associates the identified product with the corresponding bounding box. The system then generates individual product bounding boxes for each individual product within a single bounding box for each bounding box and identifies a number of individual products for the product display location based on the number individual product bounding boxes within each bounding box. Thus, the images are captured at a time when the product display areas are fully stocked, which provides the product-detection model with a template of what each product display area or shelf 105 should ideally look like and against which to compare images captured by the cameras 100 going forward to perform out-of-stock detection in the deployment stage.

Figure 5:
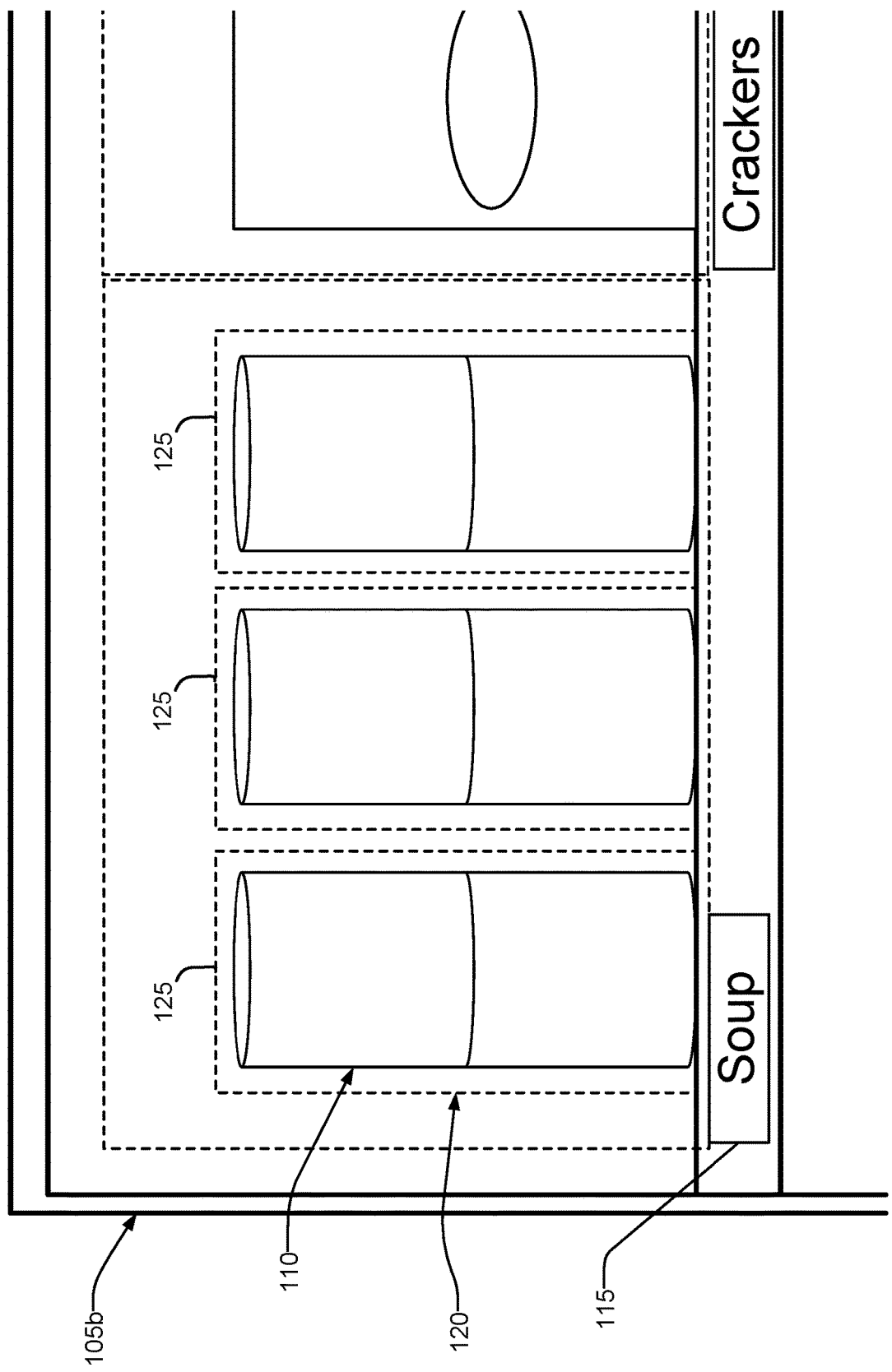
FIG. 5 illustrates an example enlarged view of a portion of the image received from the camera in FIG. 2, in accordance with various embodiments.

Accordingly, in one embodiment, the out-of-stock detection system identifies a number of individual product bounding boxes within each bounding box 120 identified for the product based on the product label 115. FIG. 5 illustrates an example enlarged view of a portion of the template image received from the camera 100 in FIG. 2 that shows a product display location with individual product bounding boxes 125 that are within the bounding box 120 for the product display location. In this example, the product label 115 for this product display location identifies the product 110 as soup and there are three cans of soup. Thus, in this example, each individual can of soup has been identified and an individual product bounding box 125 has been generated for each can of soup. Accordingly, in one embodiment, the out-of-stock detection system defines a product display location as full based on the identified number of individual product bounding boxes 125 within each bounding box 120 of the template image. Thus, the result of the onboarding process, in one embodiment, is a set of template images or image data showing fully stocked shelf units segmented and labeled by product. Alternatively, the template images do not necessarily need to reflect stock or fully stocked information. Instead, the template image could simply identify the location of individual product display locations with an identification of their corresponding product by bounding box. This initial onboarding process can also be performed, for example, when the layout or planogram of the store is changed and the out-of-stock detection system needs to reregister a new set of products within a particular camera's field of view.

Thus, in this embodiment, the product-detection model generates individual product bounding boxes 125 for each bounding box 120 and compares the number of individual products 110 within each display location from the image to the number of product associated with the fully stocked shelf unit of the template image and determines that the number of "Soda" products identified from the image does not match the number associated with the template image for shelf unit 105*b*. Thus, in response to determining that the number of individual products within the display location does not match the number of product associated with the fully stocked product display area of the template image, the out-of-stock detection system generates an out-of-stock notification for "soda" to a store client device.

Accordingly, in the deployment stage, the out-of-stock detection system maintains the template image for the product display areas or shelves in the store. Each product display area includes a number of product display locations for displaying a predetermined number of products of the same type and/or brand. The template image of each display area corresponds to a fully stocked product display area where the product display locations are full with their corresponding product.

The out-of-stock detection system receives image data of a product display area from one or more cameras periodically, as described above. The out-of-stock detection system, in this embodiment, identifies product labels in the image data and generates bounding boxes. The system generates a set of individual product bounding boxes that each identify an individual product within the display location corresponding to a single bounding box. Accordingly, the system compares the number of individual products within the display location from the image to the number of product associated with the fully stocked product display area of the template image for each display location within the product display area. In response to determining that the number of individual products within the display location does not match the number of product associated with the fully stocked product display area of the template image, the system generating an out-of-stock notification for the product corresponding to the product display location to a store client device.

Thus, in the deployment stage, the cameras 100 capture an image an hour, for example, and for each image, for loops over each template, crops the region corresponding to each bounding box and forward passes that template over the captured image to predict whether the product corresponding to each bounding box is in stock, out of stock, low (e.g., 1-3 products left for that SKU), bad template (e.g., the camera shifted or a stocker changed the shelf unit organization dramatically), Planogram compliance issue (e.g., wrong product is there), or occlusion (e.g., the area of the shelf unit is blocked by an individual, cart, etc.). Then the out-of-stock detection system may compile a list of action items to send to a team of store associate stockers. In one embodiment, this list of action items is provided via an application associated with the out-of-stock detection system in the store in "Stocker Action Tools" which could be delivered to the store associates via text or an application notification via a smartphone or tablet computer (i.e., store client device 150). The list of action items can include out-of-stock notifications, incorrect prices on tags, product in wrong location, and so forth. Moreover, the out-of-stock detection system may monitor how long it takes the store associate to respond to or take action on the action items, such as restocking an out-of-stock product, since the store associate, in one embodiment manually clears the action items from within the application once they are finished restocking the product, for example.

Camera Mounting Configurations

Figure 6:
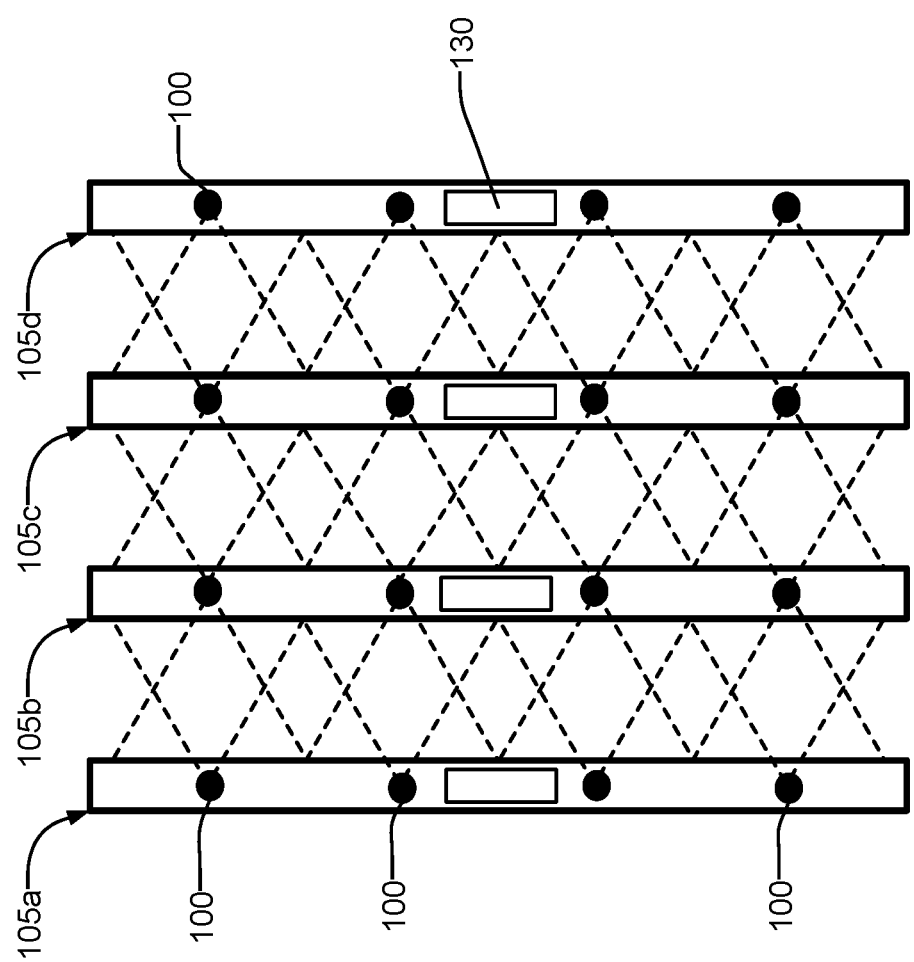
FIG. 6 shows an example top view of multiple cameras and their corresponding fields of view mounted on top of shelves in a store, in accordance with various embodiments.

FIG. 6 shows an example top view of multiple cameras 100 and their corresponding fields of view mounted on top of shelf units 105*a*-105*d* in a store, in accordance with various embodiments. In this example, there are multiple cameras 100 on shelf units 105*a*-105*d* that each comprise an aisle in the store. Each camera 100 includes a motor that allows the camera to rotate and capture an image of the shelf units on each opposing side of the shelf unit on which a respective camera 100 is mounted. For example, a camera 100 mounted on shelf unit 105*b* can capture images of shelf unit 105*a* and rotate to capture images of shelf unit 105*c*.

Thus, the square footage of shelf unit space that a single camera 100 covers is double when the cameras 100 are mounted on top of the shelf units 105 relative to having the cameras 100 mounted in the middle of each shelf units 105 (e.g., ~20 ft. vs ~10 ft.). Moreover, another benefit of mounting the cameras 100 on top of shelf units 105 is the reduction of glare off of refrigerator glass doors. Glare captured in the images caused by the ceiling lighting of the store can block important product identifying and void detection information in the images. For example, if the cameras 100 are below the top of the glass of a refrigerator, then the ceiling lights reflect off of the glass downward and may hit the cameras 100. Therefore, mounting cameras 100 on top of the shelf units 105 or refrigerators minimizes or eliminates the potential of glare from hitting the cameras 100 and, thereby, occluding the product identifying information.

Also, shown in FIG. 6 are solar panels 130 for powering the cameras 100 and their image data transmissions to the out-of-stock detection system. In other embodiments, the cameras 100 could be powered by a power outlet or by using batteries. Store shelf units are not typically provided with power outlets and batteries require regular changing. Thus, solar panels that can use light for the store lighting system may be advantageous. However, a system dependent on indoor solar lighting must make attempts to converse energy usage where possible.

Figure 7:
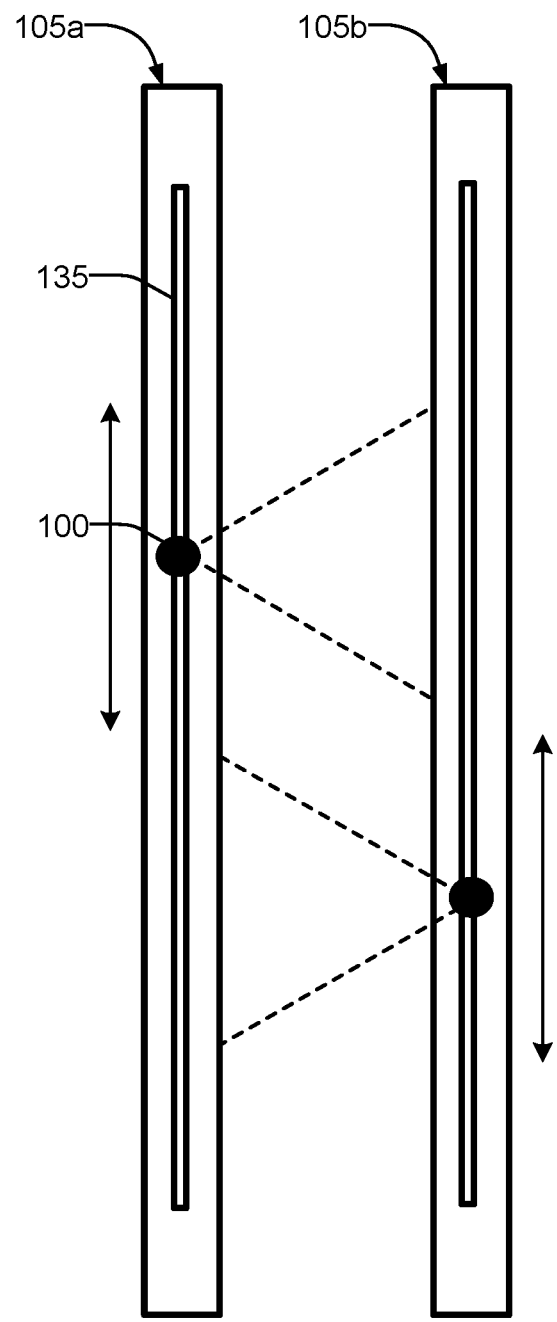
FIG. 7 shows an example top view of shelves in a store that each include a track along which a camera is movable mounted, in accordance with various embodiments.

FIG. 7 shows an example top view of shelf units in a store that each include a track 135 along which a camera 100 is movable mounted, in accordance with various embodiments. In this embodiment, a camera 100 captures images at different points along the track 135. As described above, the cameras 100 may include a motor that allows each camera to rotate and capture an image of the shelf units on each opposing side of the shelf unit on which the track 135 is mounted. Thus, for each position along track 135, the camera can pan from left to right capturing images incrementally down track 135. Allowing for translation, the number of cameras needed per aisle is relatively low compared to the embodiment shown in FIG. 5. Track 135 may also be mounted on the bottom or middle of the shelf unit and, once an hour or other period of time, cause the camera 100 to translate a small distance down the track 135, capture an image, send it to the out-of-stock detection system, then move a bit further down the track 135, and so on. While this method would increase installation and maintenance costs relative to the method described with respect to FIG. 6, it would permit the cost effective use of a relatively higher resolution camera relative to the method described with respect to FIG. 6.

Figure 8:
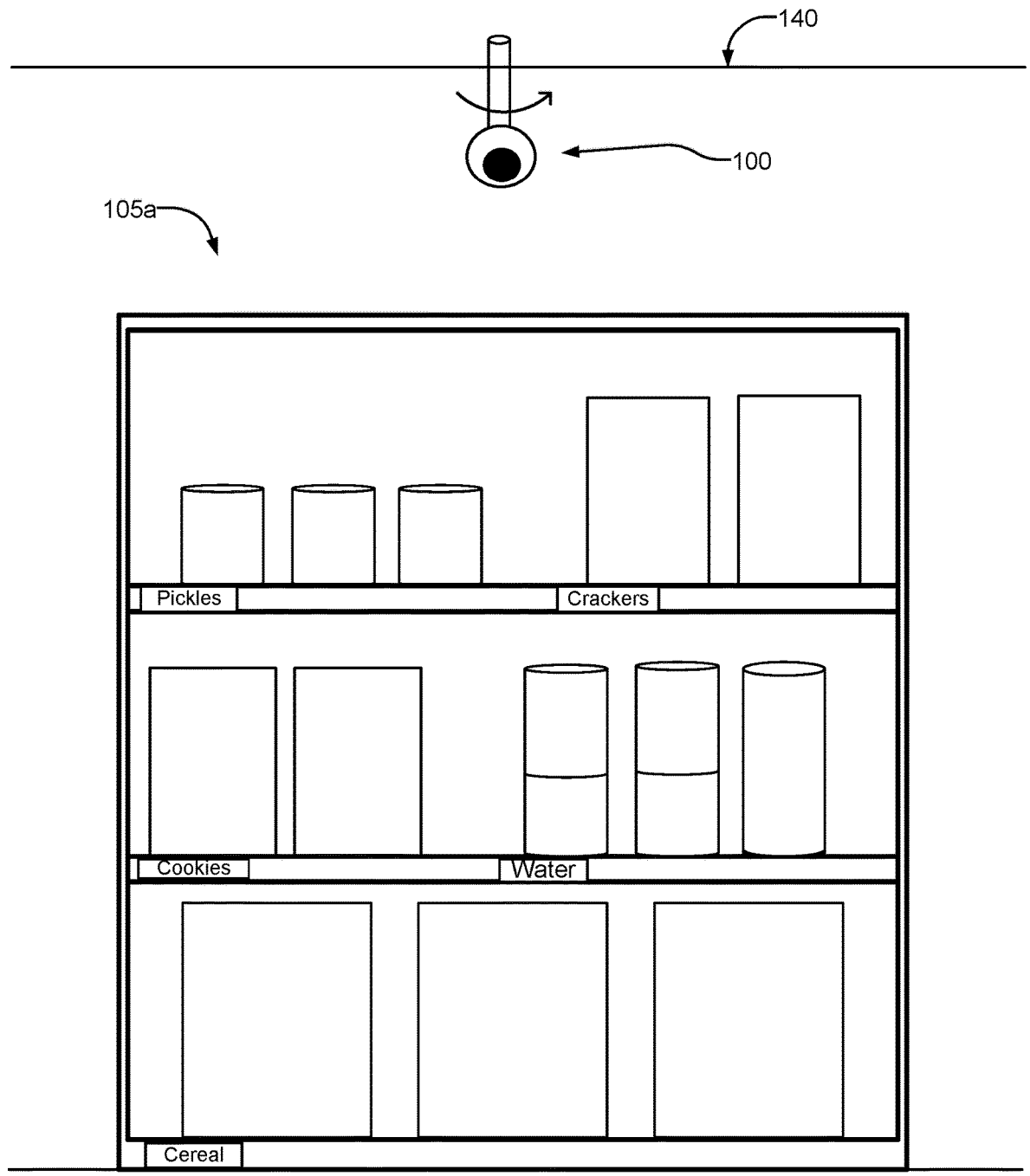
FIG. 8 shows an example side view of a shelf in a store that include a cable hanging above along which a camera is movable mounted, in accordance with various embodiments.

FIG. 8 shows another example of a movable mounted camera 100, in accordance with various embodiments. In this embodiment, a camera 100 is movable attached to a cable 140 or zip line hanging above shelf unit 105*a* from which camera 100 captures images at different points along the cable 140 in a manner similar to that described above with respect to FIG. 7. As described above, the cameras 100 may include two motors. One motor that moves camera 100 back and forth along cable 140 and a second motor that allows each camera 100 to rotate and capture an image of the shelf units 105 on each opposing side of the shelf unit 105*a* above which the cable 140 is hanging. Thus, for each position along cable 140, the camera 100 can pan from left to right capturing images incrementally down cable 140. As above, this allows for translation, which renders the number of cameras needed per aisle relatively lower compared to the embodiment shown in FIG. 5. Moreover, in one embodiment, the movable camera 100 could be mounted on a drone above shelf unit 105*a* from which camera 100 captures images.

Planogram Compliance

Moreover, the out-of-stock detection system 160 provides a tool for store associates to update the planogram when a shelf is changed in the store and relay that information directly to the backend of the system. After an associate changes a shelf, the associate may use store client device 150 showing the previous picture of the shelf and the previous products. The system, from the store client device (e.g., a tablet computer), enables the store associate to cause a picture to be captured from the relevant shelf camera 100 and manually mark the image as the new template image for use as a template by the system. The system then presents both the new and old images side by side to the store associate, allowing the store associate to select the products that changed on the shelf and input their corresponding universal product code (UPC). Using the UPC, the system would then be able to automatically fill out the remaining information.

In another embodiment, with enough resolution, the camera 100 would be able to read the tags on the shelf directly. The camera 100 or a remote server of the system can then process the image, use a tag detection algorithm to determine if any tags have been added or removed and then perform OCR to determine if any of the tags have changed. If the product on the shelf has changed the system can then update the planogram automatically. Similarly, if the system is uncertain about any particular tag and the camera is able to pan, tilt and/or zoom, the camera 100 may then angle itself to provide a clearer image of that particular tag.

Example System Environment and Architecture

Figure 9:
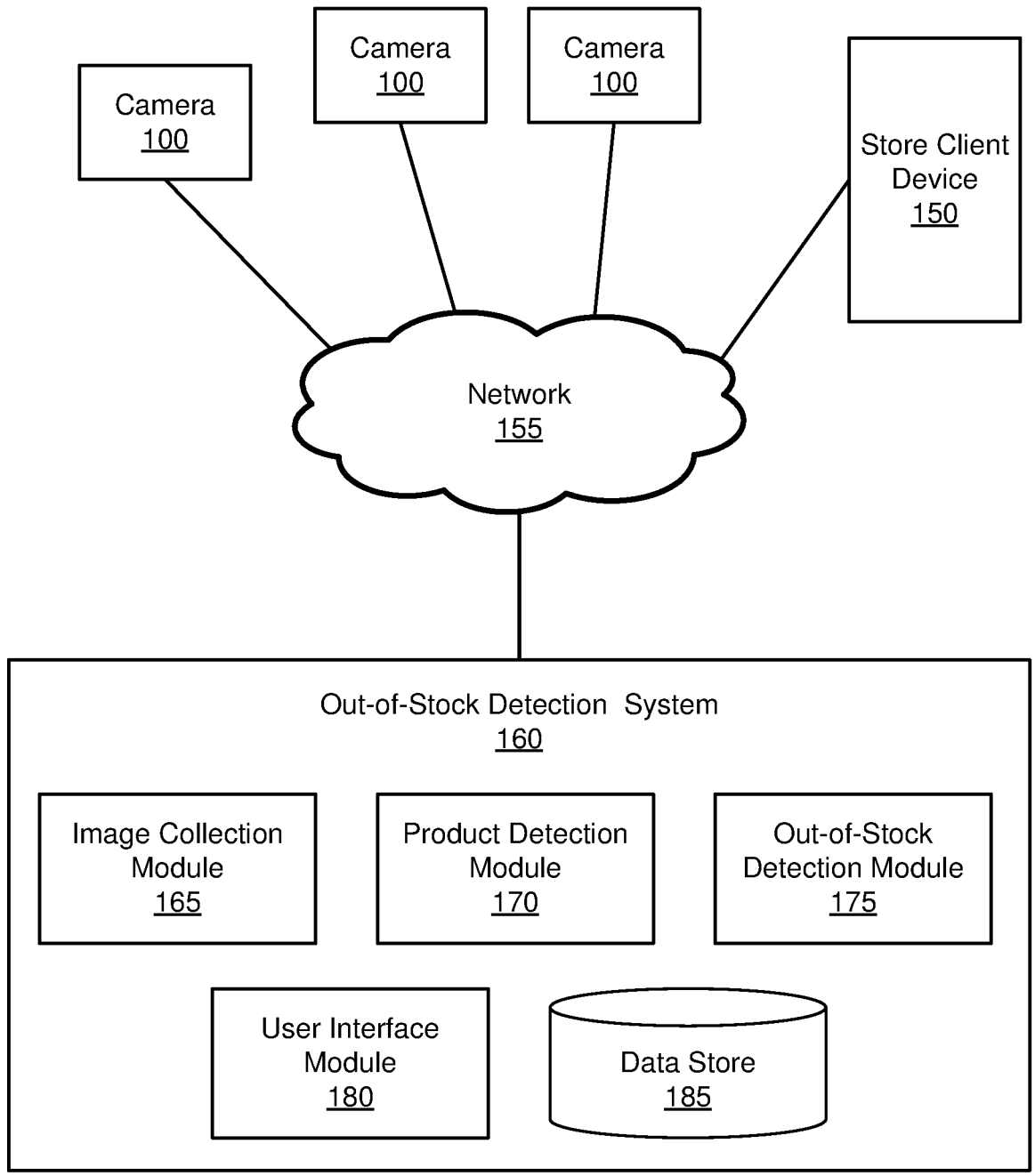
FIG. 9 illustrates an example system environment and architecture for an out-of-stock detection system, in accordance with some embodiments.

FIG. 9 illustrates a system environment for an out-of-stock detection system, in accordance with various embodiments. FIG. 9 includes one or more cameras 100, a store client device 150, a network 155, and an out-of-stock detection system 160. Alternate embodiments may include more, fewer, or different components and the functionality of the illustrated components may be divided between the components differently from how it is described below.

An out-of-stock detection system 160 notifies store management that a product is out of stock. Stores, such as grocery stores, include a number of aisles created by rows of shelves on which products are stocked and the location of the products within the store is organized, albeit often loosely, in a predetermined layout known as a planogram. Each camera 100 is associated with a unique camera ID and mounted on a shelf with a predetermined set of products within the camera's field of view known to the out-of-stock detection system 160 based on the planogram of the store. Each camera 100, therefore, collects image data for a predetermined set of products on opposing shelves for on-shelf inventory tracking and out of stock detection. In one embodiment, the camera 100 is equipped with a motor to cause the camera 100 to pan, for example, from the top left of the opposing shelf, to the top right, angle downward, and then pan from left to right again in an iterative manner until it hits the bottom right. This can be achieved using 1-5 MP camera, for example, by effectively scanning the viewable area of the camera with a 20-40 MP camera. Moreover, each camera 100 may, along with one or more images of the opposing shelf unit, send information about the camera 100 to the out-of-stock detection system, such as a unique device ID, battery level, external battery connection, IP address, software version number. Moreover, since store shelves are roughly planar and the camera 100 are often mounted on the other shelf across the aisle and directed as close to normal the tracked shelf, the distance from the top left corner of the tracked product region and the center tracked product region, the camera must have an appropriate depth of field to be able to focus in those areas. Each camera 100 may be equipped with a cellular connectivity modem for communicating directly with a cell tower, for example. In another embodiment, each camera 100 may be equipped with a Wi-Fi chip and connected straight to a pre-existing network.

The store client device 150 (e.g., a desktop computer, mobile device, tablet computer, etc.) receives information about the status of the store from the out-of-stock detection system 160 and presents the information to a store associate (e.g., a store owner, manager, or employee). For example, the store client device 150 may present a store associate with information about which items are out of stock and when the items were first detected to be out of stock. The store client device 150 may also present a map that indicates where, in the store, out-of-stock items are located. In some embodiments, the store client device 150 presents images within which the out-of-stock detection system 160 has detected out-of-stock items. These images may include bounding boxes that identify where in the image an out-of-stock item is located.

The cameras 100 and the store client device 150 can communicate with the out-of-stock detection system 160 via the network 155, which may comprise any combination of local area and wide area networks employing wired or wireless communication links. In one embodiment, the network 155 uses standard communications technologies and protocols. For example, the network 155 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 155 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 155 may be represented using any format, such as hypertext markup language (HTML) or extensible markup language (XML). In some embodiments, all or some of the communication links of the network 155 may be encrypted. Moreover, the images can be communicated via Bluetooth or radio. For example, each individual camera may be equipped with a cellular connectivity modem that communicates directly with a cell tower. If the modem can transfer data then the camera can send the image and information directly to the cloud for processing by the out-of-stock detection system 160. The camera may also send a SMS based alert with the current state of a shelf unit.

The out-of-stock detection system 160 detects out-of-stock items within the store based on images received from the cameras 100. The out-of-stock detection system 160 may be located within the store or remotely. The out-of-stock detection system 160, illustrated in FIG. 9, includes an image collection module 165, a product detection module 170, an out-of-stock detection module 175, a user interface module 180, and a data store 185. Alternate embodiments may include more, fewer, or different components from those illustrated in FIG. 9, and the functionality of each component may be divided between the components differently from the description below. Additionally, each component may perform their respective functionalities in response to a request from a human, or automatically without human intervention.

The image collection module 165 collects images from the cameras 100 and, in some embodiments, from the store client device 150. The image collection module 165 stores collected images and image labeling data in the data store 190. The product detection module 150 detects products in images captured by the cameras 100. In some embodiments, the product detection module 150 identifies products in the received images automatically. For example, the product detection module 150 may apply an optical character recognition (OCR) algorithm to the received images to identify text in the images, and may determine which products are captured in the image based on the text (e.g., based on whether the text names a product or a brand associated with the product). The product detection module 150 also may use a barcode detection algorithm to detect barcodes within the images and identify the products based on the barcodes. For example, store shelves may display a product label that contains a barcode, or written numerical values that represent the stock keeping unit, for each product on the shelves, and the product detection module 150 may identify the product above each product label as the product associated with the barcode or stock keeping unit. Alternatively, the product detection module 150 detects products within the images by requesting that the store associate identify the products in the images using the store client device 150.

In some embodiments, the product detection module 150 uses a machine-learned product-detection model to detect the products in the images. The product-detection model can be trained based on template images that have been labeled by the store associate or other human labeler. For example, the training data may label a product as out-of-stock only when a shelf is completely empty. In this instance then, the product-detection model will tend to generate out-of-stock notifications when the shelf is completely empty. In another instance, if the training data may include labeling shelves that are out-of-stock when the shelves are mostly empty (e.g., have only one or two products on the shelf), then the model will tend to identify partly stocked products (or almost empty shelves) as out-of-stock. In some embodiments, multiple models are trained where one model detects empty shelves and another model detects partly empty shelves. In some embodiments, the product-detection model is trained based on labeled images of the products offered for sale by the store. The product-detection model identifies the products in the images aided by what images should be in the images based on the planogram and camera ID associated with each image. In some embodiments, the product-detection model generates bounding boxes for each product and determines a likelihood that the product-detection model's prediction is correct. The product-detection model can be a convolutional neural network that has been trained using labeled training data via Stochastic Gradient Descent based on the templates images. Additionally, the product detection module 150 uses the product-detection model to compare images received from the one or more cameras 100 to template images captured by the store client device 150 or to higher resolution images captured by the cameras 100 in the onboarding process.

In some embodiments, the product detection module 150 detects empty portions of shelves or display areas within the store. The product detection module 150 can generate bounding boxes that identify portions of images received from the cameras 100 where a product is out of stock. While the bounding boxes may identify portions of images where a product is out of stock, the bounding boxes may not actually identify which product is out of stock. The bounding boxes may be generated using a machine-learned model that is trained based on template images of empty shelves or display areas within the store. The machine-learned model may also be trained based on template images with one or more stocked products as well.

The out-of-stock detection module 175 detects out-of-stock items in images received from the camera 100. The out-of-stock detection module 175 uses products detected by the product detection module 150 to detect out-of-stock items in the received images. For example, the out-of-stock detection module 175 may use the template images to determine which products are supposed to be detected in an image receive from a particular camera 100 based on the unique camera ID. Moreover, the out-of-stock detection module 175 may determine which products are supposed to be detected in the image by identifying one or more template images that capture areas of the store that are captured by the received images. If the out-of-stock detection module 175 determines that an item is not detected in the image received from the camera 100 that is supposed to be detected in the image, the out-of-stock detection module 175 determines that the item is out of stock.

In some embodiments, the out-of-stock detection module 175 uses product labels on shelves to determine if an item is out of stock. The out-of-stock detection module 175 can detect product labels bounding boxes in the images received from the cameras 100 and can extract information from each product label like the barcode, the stock keeping unit, the price, the sale price if it is on sale, the name of the product, and any other visual information that is on the product label. For example, the out-of-stock detection module 175 may extract the name of a product, stock keeping unit, or a barcode from the product label and the out-of-stock detection module 175 may determine that the products identified by the product labels should be detected in the image received from the camera 100 near that product label. If the out-of-stock detection module 175 does not detect the items identified by the product label near (e.g., immediately above or below) that tag, the out-of-stock detection module 175 determines that the items are out of stock.

In some embodiments, the out-of-stock detection module 175 compares bounding boxes identifying empty shelves or display areas to information from identified product labels to identify out-of-stock items. The out-of-stock detection module 175 may use a machine-learned model to identify the locations of product labels within images received from the camera 100. The out-of-stock detection module 175 may then use an optical character recognition (OCR) algorithm to extract information from a product label that describes the product. For example, the out-of-stock detection module 175 may extract the name of the product, a product identifier (e.g., the stock keeping unit or the Universal Product Code for the product), or the price of the product from the product label. The out-of-stock detection module 175 can then associate product labels with empty portions of the store by comparing the location of the bounding boxes identifying empty shelves or display areas to the locations of identified product labels to identify which product labels correspond to the bounding boxes. In some embodiments, the out-of-stock detection module 175 associates each bounding box identifying empty shelves or display areas with the closest identified product label. After associating the bounding boxes with the product labels, the out-of-stock detection system can identify the products that are out of stock within each bounding box based on the information extracted from the product labels.

When the out-of-stock detection module 175 determines that an item is out of stock, the out-of-stock detection module 175 notifies the store client device 150 that the item is out of stock. The out-of-stock detection module 175 may transmit an item identifier for the out-of-stock item as well as a timestamp of when the item was detected as being out of stock. In some embodiments, the out-of-stock detection module 175 generates a bounding box that describes where the out-of-stock item would be in the image received from the camera 100. The out-of-stock detection module 175 transmits the image with the bounding box to the store client device 150 for presentation to the store associate.

The user interface module 180 interfaces with the store client device 150. The interface generation module 170 may receive and route messages between the out-of-stock detection system 160, the cameras 100, and the store client device 150, for example, instant messages, queued messages (e.g., email), text messages, or short message service (SMS) messages. The user interface module 180 may provide application programming interface (API) functionality to send data directly to native client device operating systems, such as IOS®, ANDROID™, WEBOS®, or RIM®.

The user interface module 180 generates user interfaces, such as web pages, for the out-of-stock system 130. The user interfaces are displayed to the store associate through the store client device 150. The user interface module 180 configures a user interface based on the device used to present it. For example, a user interface for a smartphone with a touchscreen may be configured differently from a user interface for a web browser on a computer.

The user interface module 180 can provide a user interface to the store client device 150 for capturing template images of store shelves that hold products for sale by the store. Additionally, the user interface module 180 may provide a user interface to the store client device 150 for labeling products in template images. The user interface module 180 receives images from the camera 100 and the store client device 150 and stores the images in the data store 185.

The data store 185 stores data used by the out-of-stock detection system 160. For example, the data store 185 can store images from the camera 100 and the store client device 150. The data store 185 can also store location information associated with template images, and can store products identified in images by the product detection module 150. The data store 185 can also store product information, a store map or planogram, shopper information, or shopper location information. In some embodiments, the data store 185 also stores product-detection models or other machine-learned models generated by the out-of-stock detection system 160. In one embodiment, at least some of the computation occurs locally on the camera system itself that includes a relatively small deep learning neural network. Then a larger amount of the computation (big deep learning models) would happen on a server that is deployed inside the store. Accordingly, in one embodiment, an additional portion of the computation could happen in the cloud via a back end of the out-of-stock detection system 160.

ADDITIONAL CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    capturing first image data of a product display area in a store, the product display area including a plurality of product labels, each product label including product information describing a product associated with the product label;
    determining, from the image data, a position of each of the plurality product labels within the product display area;
    for each product label, generating a bounding box within the product display area based on the position of each product label within the product display area, each bounding box including a respective plurality of products;
    identifying a product associated with each product label based on the product information associated with each product label;
    for each product label, storing an association of the identified product with the bounding box for the product label; and
    performing an out-of-stock detection process that comprises:
        capturing second image data of the product display area that includes each bounding box, each respective bounding box including its respective plurality of products,
        providing a portion of the second image data corresponding to each bounding box as input to a classifier model, the portion corresponding to at least two of the respective plurality of products,
        receiving, as output from the classifier model, an indication that a given product in a given portion of the second image data corresponding to a given bounding box is out-of-stock, wherein the classifier model is a machine learning model that is trained to output that the given product is out-of-stock where the second image data corresponding to the bounding box features up to a threshold amount of the given product. the respective bounding box corresponding to the given product including two or more of the given product; and
        responsive to receiving the output, sending a notification that the given product is determined to be out-of-stock to a store client device.

2. The method of claim 1, wherein associated with each product label includes:
    extracting the product information from each product label by applying an optical character recognition algorithm to the first image data; and
    matching the product information to a database of products carried by the store.

3. The method of claim 1, wherein the threshold amount of the given product is greater than zero.

4. The method of claim 1, wherein the first image data and the second image data are captured by a camera mounted on the product display area.

5. The method of claim 4, wherein the first image data is captured at a higher resolution relative to the second image data.

6. The method of claim 4, wherein the camera includes a motor allowing the camera to rotate 360 degrees to capture images of display areas on each of two opposing sides of the display area on which the camera is mounted.

7. The method of claim 1, wherein the product display area corresponds to a shelf unit and an aisle comprises a plurality of shelf units, and wherein the camera is mounted on a movable track on top of the plurality of shelf units comprising an aisle in the store, the camera capturing an image of each product display area along the aisle and sending the captured image with a position data for the camera along the movable track to identify the product display area.

8. A non-transitory, computer-readable medium comprising instructions that, when executed by a processor, cause the processor to:
    receive first image data of a product display area in a store from a camera, the product display area including a plurality of product labels;
    determine, from the image data, a position of each of the plurality product labels within the product display area;

generate, for each product label, a bounding box within the product display area based on the position of each product label within the product display area, each bounding box including a respective plurality of products;

identify a product associated with each product label;

associate, for each product label, the identified product with the bounding box for the product label; and perform an out-of-stock detection process that comprises:
receiving second image data of the product display area from the camera, the second image data being captured a different time relative to the first image data corresponding to image data for each bounding box identified using the first image data, each bounding box including its respective plurality of products;

providing an extracted area corresponding to each bounding box as input to a classifier model, the extracted area corresponding to at least two of the respective plurality of products;

receiving, as output from the classifier model, an indication that a given product in a given portion of the second image data corresponding to a given bounding box is out-of-stock, wherein the classifier model is a machine learning model that is trained to output that the given product is out of stock where one or more voids are detected within a bounding box while the bounding box features at least two of the given product; and sending a restocking notification for the identified product to a store client device responsive to receiving the indication.

9. The non-transitory computer-readable medium of claim 8, wherein identifying the product associated with each product label comprises:
obtaining information from a planogram of the store, the planogram identifying products associated with one or more product display areas within the store; and
matching, for at least a subset of bounding boxes of the product display area, the product in a particular bounding box the extracted product information from each product label to identify the product associated with the product label based on a location within the store associated with the product display area.

10. The non-transitory computer-readable medium of claim 8, wherein identifying the product associated with each product label comprises:
extracting the product information from each product label by applying an optical character recognition algorithm to the first image data; and
matching the product information to a database of products carried by the store.

11. The non-transitory computer-readable medium of claim 8, wherein the product display area corresponds to a shelf unit and an aisle comprises a plurality of shelf units, and wherein the camera is mounted on a movable track on top of the plurality of shelf units comprising an aisle in the store, the camera capturing an image of each product display area along the aisle and sending the captured image with a position data for the camera along the movable track to identify the product display area.

12. The non-transitory computer-readable medium of claim 8, wherein the first image data and the second image data are captured by a camera mounted on the product display area.

13. The non-transitory computer-readable medium of claim 8, wherein identifying the product associated with the bounding box as out-of-stock includes identifying one or more empty portions within the bounding box.

14. A non-transitory, computer-readable medium comprising instructions that, when executed by a processor, cause the processor to:
obtain, at a first time, first image data of a product display area in a store at a first camera resolution, the product display area including a plurality of product labels;
generate a bounding box for each of the plurality of product labels of the product display area based on a position of each product label within the product display area each bounding box including a respective plurality of products;
identify a product associated with each product label;
store, for each product label, information the identified product with the bounding box for the product label;
receive, after the first time, second image data of the product display area at a second camera resolution, the second image data corresponding to image data for each bounding box identified using the first image data, the first camera resolution being higher relative to the second camera resolution;
provide a portion of the second image data corresponding to each bounding box as input to a classifier model;
receive, as output from the classifier model, an indication that a given product in a given portion of the second image data corresponding to a given bounding box is out-of- stock, wherein the classifier model is a machine learning model that is trained to output that the given product is out-of-stock where the bounding box is less than full and features at least [[one]] two of the given product; and
send a restocking notification for the identified product to a store client device.

15. The non-transitory computer-readable medium of claim 14, wherein identifying the product associated with each product label comprises:
obtaining information from a planogram of the store, the planogram identifying products associated with one or more product display areas within the store; and
matching, for at least a subset of bounding boxes of the product display area, the product in a particular bounding box the extracted product information from each product label to identify the product associated with the product label based on a location within the store associated with the product display area.

16. The non-transitory computer-readable medium of claim 14, wherein identifying the product associated with each product label comprises:
extracting the product information from each product label by applying an optical character recognition algorithm to the first image data; and
matching the product information to a database of products carried by the store.

17. The non-transitory computer-readable medium of claim 14, wherein the first image data and the second image data are captured by a camera mounted on the product display area.

18. The non-transitory computer-readable medium of claim 14, wherein identifying the product associated with the bounding box as out-of-stock includes identifying one or more empty portions within the bounding box.

19. The non-transitory, computer-readable medium of claim 14, wherein the camera includes a motor allowing the camera to rotate 360 degrees to capture images of display areas on each of two opposing sides of the display area on which the camera is mounted.

20. The non-transitory, computer-readable medium of claim 14, wherein the product display area corresponds to a shelf unit and an aisle comprises a plurality of shelf units, and wherein the camera is mounted on a movable track on top of the plurality of shelf units comprising an aisle in the store, the camera capturing an image of each product display area along the aisle and sending the captured image with a position data for the camera along the movable track to identify the product display area.

* * * * *